UNITED STATES PATENT OFFICE.

FRANK J. BAUMGARDNER, OF CLEVELAND, OHIO, ASSIGNOR OF FOUR-TENTHS TO WORTHINGTON HOYT AND ONE-TENTH TO ARTHUR J. HUDSON, BOTH OF CLEVELAND, OHIO.

COLOR.

1,276,861.        Specification of Letters Patent.      Patented Aug. 27, 1918.

No Drawing.      Application filed November 6, 1916. Serial No. 129,724.

*To all whom it may concern:*

Be it known that I, FRANK J. BAUMGARDNER, a citizen of the United States, residing at Cleveland, in the county of Cuyahoga and State of Ohio, have invented a certain new and useful Improvement in Colors, of which the following is a full, clear, and exact description.

This invention relates to a composition of matter which to the trade is known as "color," and designates a material which is added to paint mixtures, printing ink mixtures and other mixtures to impart a desired color or tint to the mixture.

Naturally these "colors" comprise not only the primary colors as red and blue, but a vast variety of tints and shades of various colors.

The purpose of the invention herein described is to provide a "color" which is composed of a base material, inexpensive to produce, but which nevertheless forms a very efficient and satisfactory base for colors.

At the present time "colors" are produced by precipitating the coloring material of a dye upon a suitable base.

In producing such colors aluminum hydrate of a suitable degree of fineness is agitated in a tank containing water. Into this tank is put a dye such for instance as an anilin dye dissolved in a suitable solvent. The dissolved dye, the aluminum hydrate and the water are agitated, and to the mixture there is added some reagent which will precipitate the dye from solution and permit it to settle or collect upon the aluminum hydrate. When this precipitation is complete, the solid material is removed from the tank, washed, dried and pulverized if necessary. This is known commercially as "color."

It is my purpose to employ the same general process as that described above, but in place of using aluminum hydrate which is an expensive material, being prepared by certain chemical processes from natural products, to use oyster shells which are ground to a suitable degree of fineness for the purpose.

In carrying out the process the oyster shells are thoroughly washed and ground, the grinding taking place either by means of a bur mill while the shells are mixed with water, thus forming what is termed a pulp, or the shells may be dried after washing, and ground in a dried state, and subsequently mixed with water.

It will at once appear that the oyster shells being at present a refuse product, may be prepared at a very low cost, and experiment has proven that the finely ground oyster shells have the property of taking up the color when precipitated as heretofore described, in the same manner as that described with respect to aluminum hydrate; however it is my opinion that by using the finely ground oyster shells, it requires less dye to produce a given color or tint when using a given amount of finely ground oyster shells than is required to produce the same color or tint using a like amount of aluminum hydrate.

Oyster shells are largely calcium carbonate, but contain a small amount of magnesium as a carbonate and as a silicate. Ground oyster shells, however, used as a base for "color" acts in quite a different manner than mineral calcium carbonate so used, probably because the manner of its formation imparts some peculiar physical properties.

While I have particularly described my invention with respect to oyster shells, I wish to be understood as including other shells and substances which have substantially the same composition and physical properties.

Having thus described my invention, what I claim is:

1. A color comprising a base of finely ground oyster shells and coloring material which is precipitated upon the finely ground oyster shell.

2. A color comprising a base of finely ground oyster shells and a dye which is inseparably mixed with the said base.

3. A color comprising a base of substances substantially the same as found in oyster shells in finely ground condition and coloring material which is intimately and inseparably mixed with said base.

In testimony whereof, I hereunto affix my signature.

FRANK J. BAUMGARDNER.